United States Patent [19]

Perdue et al.

[11] Patent Number: 4,828,470

[45] Date of Patent: May 9, 1989

[54] TIRE RETREADING EQUIPMENT

[75] Inventors: Thad A. Perdue; Bobby G. Johnson, both of Muscle Shoals, Ala.

[73] Assignee: Robbins Tire & Rubber Co., Inc., Tuscumbia, Ala.

[21] Appl. No.: 222,267

[22] Filed: Jul. 21, 1988

Related U.S. Application Data

[63] Continuation-in-part of Ser. No. 942,878, Dec. 17, 1986, Pat. No. 4,780,949.

[51] Int. Cl.⁴ .............................................. B29C 35/00
[52] U.S. Cl. ........................................ 425/23; 156/95; 156/120; 156/DIG. 13; 425/53
[58] Field of Search ................ 425/23, 35, 48, 49, 425/52, 53; 156/95, 120, DIG. 13; 152/511, 512

[56] References Cited

U.S. PATENT DOCUMENTS

| | | | |
|---|---|---|---|
| 2,255,146 | 9/1941 | Becker | 152/511 |
| 2,307,429 | 1/1943 | Steidinger | 152/511 |
| 2,424,919 | 7/1947 | Bosomworth | 425/52 |
| 2,530,055 | 11/1950 | Green | 425/53 |
| 2,566,766 | 9/1951 | Green | 425/53 |
| 2,730,767 | 1/1956 | Thomas | 425/53 |
| 4,258,772 | 3/1981 | Nakasaki | 152/511 |
| 4,653,992 | 3/1987 | Baraldi | 425/49 |

Primary Examiner—Willard Hoag
Attorney, Agent, or Firm—Klauber & Jackson

[57] ABSTRACT

A tire retreading tube for use with a tire retreading rim formed from a pair of axially-adjacent rim sections, one of said sections having a cutout for the reception of the valve stem extending from the tube body and being formed with threads adjacent the tube. The tube has an extension of generally cylindrical form through which the stem extends, so that the extension surrounds the portion of the stem adjacent the tube, and functions as a spacer element and is effective to limit movement of the stem and the tube relatively to the rim section. Suitably, the spacer element threadedly engages the stem adjacent the tube, has a body which essentially fills the cutout circumferentially, and has end flanges to overlie the adjacent faces of the rim section with which it is to be associated.

6 Claims, 1 Drawing Sheet

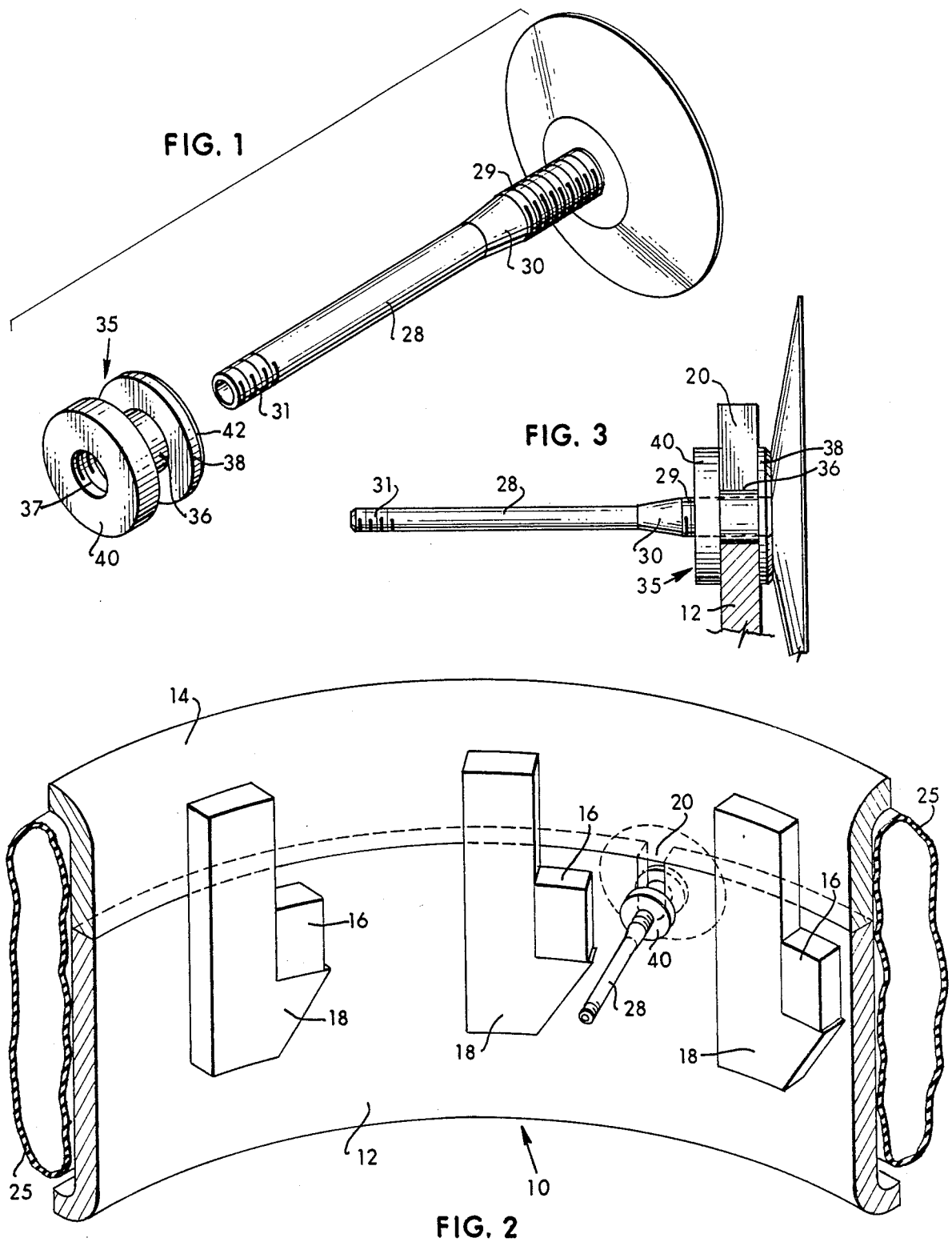

TIRE RETREADING EQUIPMENT

REFERENCE TO RELATED APPLICATION

This is a continuation-in-part of application Ser. No. 942,878, filed Dec. 17, 1986, now U.S. Pat. No. 4,780,949.

FIELD OF THE INVENTION

This invention relates generally to tire retreading and is more particularly concerned with the tube or bladder used in tire retreading operations and with its cooperation with the other parts of the retreading apparatus.

BACKGROUND OF THE INVENTION

Tire retreading or "recapping" is a common, widely-used procedure, particularly in the case of truck tires, to renew the tread of tires having a sound carcass but having their tread worn relatively thin as a result of many miles of use. In conventional retreading operations, a standard method involves abrading the road-engaging portion of the tire carcass to be retreaded, wrapping an un-cured rubber strip or "cushion" around it, adhesively applying a new tread rubber strip, which normally has been partially vulcanized, over the "cushion", and then, prior to introducing the assembly into a curing chamber where vulcanization of the tread rubber is completed and the tread rubber is vulcanized to the tire carcass, the tire carcass unit is placed upon a retreading "rim" which is annular in form, generally like the periphery of the wheel the tire is mounted on during normal use, but is conventionally made up of two axially-adjacent sections which interlock with each other upon rotation of one section relatively to the other. To effect this operation, a tube or "bladder" for the reception of air or other fluid is positioned in the tire carcass and then the tire carcass is positioned on one section of the rim, with the valve stem for introduction of the fluid extending through a slot formed in the rim section. Thereupon, the other section of the rim is placed in position and the two sections are interlocked by circumferentially rotating the second section relatively to the other. However, the slot is wider than the thickness of the valve/or inlet stem and, when the two sections of the rim are being interlocked and the two are rotated circumferentially relatively to one another, the tube has not yet been inflated and the valve stem may become twisted and/or severly bent relatively to the bladder and it may break off or tear away from the bladder or develop a leak at its juncture with the bladder. This is a problem which has been effectively attacked in my co-pending application Ser. No. 942,878, filed Dec. 17, 1986, but there is a continuing search for other approaches to the solution of this serious problem in the retreading field.

It is accordingly an object of the present invention to provide an improved construction cooperating with the valve stem of a tube or bladder used for tire retreading which prevents apparatus.

It is another object of the invention to provide a retreading assembly wherein the tube or bladder used for retreading cooperates with its rim in such manner that its stem is prevented from damaging movements when the apparatus is assembled.

BRIEF SUMMARY OF THE INVENTION

These and other objects of the invention are achieved by a tire retreading bladder construction wherein the retreading tube is formed with a valve stem which is threaded at its base, i.e., from the point it emerges from the tube body to at least 1.5 times the distance it extends through the body of the retreading rim after it has been installed, e.g., at least about ½ in., preferably at least about ¾ in., and a specially-constructed spacing element is internally threaded to cooperate with the valve stem threads and surrounds the lower portion of the valve stem adjacent its point of connection to the tube. This spacing element enters and fills the slot in the rim when the tire carcass to be retreaded is mounted for retreading, with the tube inside it, and the two sections of the rim are interlocked, and the spacing element has flanges which overlie the radially inner and outer walls of the retreading rim. As a result of this cooperation between the spacing element and the retreading rim, the stem does not bend or become exposed to damage and remains firmly in its desired position at all times.

BRIEF DESCRIPTION OF THE DRAWINGS

An illustrative embodiment of the invention is shown in the accompanying drawings wherein:

FIG. 1 is an exploded perspective view of the valve stem, and spacing element and associated tube construction embodying feature of the present invention;

FIG. 2 is a fragmentary perspective view similar to FIG. 1 of an assembled retreading rim, showing the relationship of the two rim sections with the valve stem and spacing element embodying features of the present invention; and FIG. 3 is a side elevation, partly in section, of the valve stem and spacer relationship shown in FIG. 2.

DETAILED DESCRIPTIN OF THE PREFERRED EMBODIMENT

Referring to the drawings, and particularly to FIG. 2, the retreading rim is a substantially annular member 10 which is split circumferentially, i.e. formed from two axially-adjacent sections 12 and 14. For ease of description, the split retreading rim 10 is shown without other appendages normally carried by a conventional retreading rim but not relating to the present invention. The showing of the tire carcass, which would normally surround the tube illustrated has also been omitted. The section 12 shown in FIG. 2 has a plurality of catches 16 around its inner surface. The second rim section 14, which cooperates with rim section 12, has locking members or hooks 18 which are carried by section 14 in spaced relationship corresponding to the catches 16. When the two rim sections are interlocked by relative circumferential rotation to form the completed ring, as seen in FIG. 2, the locking members 18 engage catches 16 to hold the two sections together in a secure fashion. Rim section 12 is also formed with a slot or cutout 20, as seen in FIG. 2. Mounted upon rim 10 is a retreading tube or bladder 25 which is provided with a metal valve or inlet stem 28 which extends through slot 20. The valve stem 28 is suitably anchored in the tube body in conventional manner, e.g. by having a flared or flanged inner end embedded in the tube rubber (not shown).

The valve stem 28 is threaded at its inner end 29, i.e., the end adjacent the elastomeric body of tube 25, as seen in FIG. 1, the threading extending along the stem for at least ½ in., preferably about ¾ in., but it can extend any desired additional distance, e.g., the entire length of the stem, if desired. In the embodiment illustrated, the inner end 29 of the valve stem 28 which is threaded is also slightly enlarged so that the stem 28 has an increased external diameter in this area 29 which is joined to the remainder of the stem body by a shoulder 30, and this is preferred, but the stem can be of uniform external diameter, if desired. The free end of the valve stem 28 is preferably threaded, as shown at 31, for reception of a cap (not shown), but this may be omitted, if desired.

In any case, in accordance with the invention, there is provided a rigid spacer element 35, suitably formed from metal. The spacer element 35 can be viewed as an extension of the tube 28, in effect. As seen in FIGS. 1 and 3, the spacer element 35 is generally cylindrical in shape with a body 36 and has a threaded axial bore 37. The body 36 has an inner flange 38 which is constructed to lie against the body of tube 28 and against the radially-outer wall of rim section 12, and an outer flange 40 which will lie interiorly of the retreading rim against the radially-inner wall of rim section 12. The distance between the two flanges 38 and 40 corresponds approximately to the thickness of the retreading rim which, in the usual case, is approximately ¼ in., which may of course vary from rim to rim for which the spacing element 35 is constructed.

The flanges 38 and 40 themselves can vary in thickness as long as they are thick enough to be rigid and have strength to resist bending stresses. The inner flange 38 which overlies the body of the tube 25 should be relatively thin, e.g., approximately 1/16 in. in thickness so that it will permit the tube to lie close to the retreading rim, and the outer edge of flange 38 may be beveled, if desired, as shown at 42 in FIG. 4, to facilitate its cooperation with the tube 28. The outer flange 40 which lies interiorly of the retreading rim is preferably thicker than flange 38 in order to facilitate hand manipulation of the spacer element 35.

In the use of the construction of the invention, the rim section 12 is placed upon a suitable supporting surface such as the floor. After the tire carcass has been prepared for retreading, e.g., by abrading the road-engaging portion of the carcass, wrapping an uncured rubber cushion around it, applying adhesive, and then applying a new, partially cured or vulcanized tread rubber strip, the tube 25 is placed in a deflated condition in the tire carcass to be retreaded and the spacer unit 35 is threaded into place upon the valve stem 28 so that the spacer unit 35 lies snugly against the tube 25. The advantage of having the threaded area 29 of increased diameter is that the spacer element 35 can be slipped over the remainder of valve stem 28 of lesser diameter and needs to engage only the relatively short threaded portion 29. The carcass can also be prepared for conventional retreading in any other conventional manner using partially-cured or uncured tread rubber. This prior preparation of the carcass forms no part of the present invention and is discussed merely for illustrative purpose. The prepared carcass and the tube 25 are then placed over the rim section 12 with the valve stem 28 of the tube 25 extending through the slot 20 and the spacer element 35 being seated in the slot with the flanges 38 and 40 overlying the adjacent faces of the retreading rim, as seen in FIG. 2. Alternatively, the spacer element 35 can be loosely threaded upon the valve stem 28 and, when the carcass and tube are mounted upon rim section 12 and the spacer element 35 is positioned in the slot 20 of rim section 12, the spacer element 35 can be tightened to draw the tube against the rim section 12 so that a firm mounting results with the valve stem being secured against movement relatively to the tube 25 while at the same time being centered in the slot 30 and being protected against damage by undesired contact with the surfaces of the rim section. Thereupon, the second rim section 14 is placed upon the first rim section 12 with the hooks 18 out of engagement with the catches 16 and, in the embodiment illustrated, it is rotated clock-wise so that the hooks engage the catches and the two rim sections are interlocked for further handling, as seen in FIG. 2. The entire assembly is then ready to be placed in a curing apparatus (not shown) in conventional manner. As mentioned, the spacer element 35 can be viewed as an extension of the tube 25 which extends into the slot 20 of retreading rim 12 to substantially fill the slot space circumferentially and protect the valve stem 28 and the tube 25 from damage when the rim sections 12 and 14 are rotated relatively to one another.

After the vulcanization has been completed and the parts have cooled, rim section 14 is disengaged from the rim section 12, e.g. by counter-clockwise rotation, and the carcass, retreaded tire, and the contained retreading tube with attached spacer element 35 are removed, the tube and spacer element 35 then being also removed from the tire for re-use in another retreading operation. By reason of the construction of the invention, the tube can be used repeatedly without damage resulting from normal handling and interlocking of the rim sections.

It will be obvious that various changes and modifications can be made without departing from the scope of the invention as defined in the appended claims and it is intended, therefore, that all matter contained in the foregoing description and in the drawing shall be interpreted as illustrative only and not in any way as limitative of the invention.

We claim:

1. In combination with a tire retreading rim formed from a pair of axially-adjacent rim sections, one of which has a cutout for receipt of the valve stem of a retreading tube mounted upon said rim, a retreading tube encircling said rim, said retreading tube having a valve stem extending therefrom and said tube having an extension of generally cylindrical form through which said stem extends, whereby the extension surrounds the portion of the stem adjacent said tube, said stem being threaded adjacent said tube and said extension being threadedly engaged with said stem adjacent said tube, said extension being disposed in said cutout with the valve stem extending inwardly of said rim said extension substantially filling said cutout and to said rim section.

2. For use with a tire retreading rim formed from a pair of axially-adjacent rim sections one of which has a cutout for reception of the valve stem of a retreading tube mounted upon said rim, a retreading tube for encircling said rim, said retreading tube having a valve stem extending therefrom, said stem being threaded adjacent said tube, and an internally-threaded spacer element of generally cylindrical form through which said stem extends and threadedly engaged therewith, whereby the spacer element surrounds the portion of the stem adjacent said tube, said spacer element being shaped to be received in said cutout with the valve stem extending inwardly of said rim.

3. A construction as defined in claim 2, wherein said spacer element has a cylindrical body portion for reception in said cutout, and flanges at its ends to overlie the adjacent surfaces of the retreading rim section with which said spacer element is associated.

4. A construction as defined in claim 3, wherein the portion of said stem which is threaded has a greater diameter than the remainder of said stem.

5. A retreading tube assembly for mounting on a retreading rim formed from a pair of axially-adjacent rim sections, one of which has an axial cutout, a retreading tube, a valve stem extending from said tube and being threaded adjacent said tube, and a spacer element threadedly engaged with said valve stem, said spacer element being substantially cylindrical and having a body dimensioned to be received in said cutout and to substantially fill said cutout at least circumferentially, an inner flange overlying said tube and surrounding said valve stem, and an outer flange constructed to overlie the inner face of said rim section adjacent said cutout.

6. An assembly as defined in claim 5, wherein said threaded portion of said valve stem adjacent said tube has a greater diameter than the remainder of said stem.

* * * * *